US012619289B2

(12) United States Patent
Lim et al.

(10) Patent No.: US 12,619,289 B2
(45) Date of Patent: May 5, 2026

(54) FOLDING PORTABLE DISPLAY DEVICE

(71) Applicant: Google LLC, Mountain View, CA (US)

(72) Inventors: Yongho Lim, Chicago, IL (US);
Peiwen Hung, New Taipei City (TW);
Han-Wen Yeh, New Taipei City (TW);
Wen Shian Lin, New Taipei City (TW)

(73) Assignee: Google LLC, Mountain View, CA (US)

( * ) Notice: Subject to any disclaimer, the term of this patent is extended or adjusted under 35 U.S.C. 154(b) by 249 days.

(21) Appl. No.: 18/549,585

(22) PCT Filed: May 30, 2023

(86) PCT No.: PCT/US2023/023865
§ 371 (c)(1),
(2) Date: Sep. 7, 2023

(87) PCT Pub. No.: WO2024/248799
PCT Pub. Date: Dec. 5, 2024

(65) Prior Publication Data
US 2025/0130613 A1 Apr. 24, 2025

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC .............................. G06F 1/1681; G06F 1/1652
See application file for complete search history.

(56) References Cited

U.S. PATENT DOCUMENTS

| | | | |
|---|---|---|---|
| 9,541,962 B2 | 1/2017 | Siddiqui | |
| 9,874,048 B1 | 1/2018 | Hsu | |
| 10,036,188 B1 | 7/2018 | Yao et al. | |
| 10,664,021 B1 | 5/2020 | Hsu et al. | |
| 10,845,850 B1 | 11/2020 | Kang et al. | |
| 11,169,578 B2 | 11/2021 | Hsu | |
| 11,231,754 B2 | 1/2022 | Kang et al. | |

(Continued)

FOREIGN PATENT DOCUMENTS

| | | |
|---|---|---|
| CN | 109488681 A | 3/2019 |
| CN | 112995368 B | 12/2021 |

(Continued)

OTHER PUBLICATIONS

Notice of Intent to Grant, and translation thereof, from counterpart Application No. 112136197 dated Mar. 3, 2025, 12 pp.
(Continued)

*Primary Examiner* — Rockshana D Chowdhury
(74) *Attorney, Agent, or Firm* — Shumaker & Sieffert, P.A.

(57) ABSTRACT
An example folding device includes a first assembly; a second assembly; a hinge assembly; a first assembly comprising: a first gear defining a first gear axis; a first scoop receiver defining a first scoop axis; and a continuous display spanning the hinge assembly from the first assembly to the second assembly; and first assembly linkage components comprising: a first arm having a. medial end rotatably connected to the hinge assembly about the first gear axis and a lateral end slidably connected to the first assembly; and a first scoop having a. curved medial end that slides within the first scoop receiver about the first scoop axis and a lateral end rotatably connected to the first assembly about a first scoop rotating center.

18 Claims, 10 Drawing Sheets

(56) References Cited

U.S. PATENT DOCUMENTS

| | | | |
|---|---|---|---|
| 11,243,578 B2 | 2/2022 | Torres et al. | |
| 11,294,431 B2 | 4/2022 | Torres et al. | |
| 11,353,931 B2 | 6/2022 | Hsu | |
| 11,435,785 B2 | 9/2022 | Song et al. | |
| 11,467,633 B2 | 10/2022 | Liao et al. | |
| 11,470,735 B2 | 10/2022 | Kim et al. | |
| 11,537,173 B2 | 12/2022 | Kim et al. | |
| 11,543,854 B2 | 1/2023 | Park et al. | |
| 11,550,358 B2* | 1/2023 | Cheng | H04M 1/022 |
| 11,561,588 B2 | 1/2023 | Hsu | |
| 11,614,780 B2 | 3/2023 | Kim et al. | |
| 11,619,978 B2 | 4/2023 | Jan et al. | |
| 11,625,073 B2 | 4/2023 | Shim et al. | |
| 11,625,076 B2* | 4/2023 | Yao | G06F 1/1616 |
| | | | 16/354 |
| 11,656,659 B2 | 5/2023 | Choi | |
| 11,662,781 B2 | 5/2023 | Kang et al. | |
| 11,706,886 B2* | 7/2023 | Wu | H05K 5/0217 |
| | | | 361/807 |
| 11,726,530 B2 | 8/2023 | Kang et al. | |
| 11,762,433 B2 | 9/2023 | Kim et al. | |
| 11,809,239 B2 | 11/2023 | Hwang et al. | |
| 11,825,620 B2* | 11/2023 | Zhao | H05K 5/0226 |
| 11,834,880 B2* | 12/2023 | Peng | E05D 11/082 |
| 11,846,998 B2* | 12/2023 | Wu | H05K 5/0226 |
| 11,856,721 B2* | 12/2023 | Cheng | G06F 1/1652 |
| 11,937,391 B2* | 3/2024 | Gong | H04M 1/0268 |
| 11,977,421 B2* | 5/2024 | Yang | E05D 11/082 |
| 12,031,570 B2* | 7/2024 | Hsu | G06F 1/1681 |
| 12,047,521 B2* | 7/2024 | Liao | G06F 1/1681 |
| 12,058,276 B2* | 8/2024 | Jiang | H04M 1/022 |
| 12,105,559 B2* | 10/2024 | Ou | G06F 1/1652 |
| 12,153,475 B2* | 11/2024 | Zhao | G06F 1/1681 |
| 2016/0205792 A1 | 7/2016 | Ahn | |
| 2018/0024593 A1 | 1/2018 | Seo | |
| 2018/0335679 A1 | 11/2018 | Hashimoto et al. | |
| 2019/0268456 A1 | 8/2019 | Park et al. | |
| 2020/0264673 A1 | 8/2020 | Kim et al. | |
| 2020/0348732 A1 | 11/2020 | Kang et al. | |
| 2020/0383219 A1 | 12/2020 | Hale et al. | |
| 2020/0409427 A1* | 12/2020 | Hsu | G06F 1/1681 |
| 2021/0026407 A1 | 1/2021 | Park et al. | |
| 2021/0034116 A1 | 2/2021 | Torres et al. | |
| 2021/0034117 A1 | 2/2021 | Torres et al. | |
| 2021/0041921 A1 | 2/2021 | Kang | |
| 2021/0048844 A1 | 2/2021 | Hsu | |
| 2021/0048852 A1 | 2/2021 | Hsu | |
| 2021/0081007 A1 | 3/2021 | Jan et al. | |
| 2021/0120687 A1 | 4/2021 | Kim et al. | |
| 2021/0165466 A1 | 6/2021 | Kang et al. | |
| 2021/0247815 A1 | 8/2021 | Shim et al. | |
| 2021/0333838 A1 | 10/2021 | Song et al. | |
| 2021/0373612 A1 | 12/2021 | Hwang et al. | |
| 2021/0373614 A1 | 12/2021 | Kim et al. | |
| 2022/0035422 A1 | 2/2022 | Torres et al. | |
| 2022/0091635 A1 | 3/2022 | Ou et al. | |
| 2022/0113770 A1 | 4/2022 | Kang et al. | |
| 2022/0147114 A1 | 5/2022 | Torres et al. | |
| 2022/0155828 A1* | 5/2022 | Hsiang | G06F 1/1681 |
| 2022/0303371 A1* | 9/2022 | Liao | H04M 1/0268 |
| 2023/0021638 A1* | 1/2023 | Yun | G06F 1/1681 |
| 2023/0152849 A1 | 5/2023 | Park et al. | |
| 2023/0205281 A1 | 6/2023 | Kim et al. | |
| 2023/0205282 A1 | 6/2023 | Hwang et al. | |
| 2023/0229204 A1 | 7/2023 | Shim et al. | |
| 2023/0251692 A1 | 8/2023 | Kang et al. | |
| 2023/0279898 A1* | 9/2023 | Liu | H05K 5/0226 |
| | | | 361/807 |
| 2023/0359252 A1 | 11/2023 | Kang et al. | |
| 2023/0384822 A1* | 11/2023 | Lee | G06F 1/1618 |
| 2024/0074075 A1* | 2/2024 | Kim | G06F 1/1616 |
| 2024/0427388 A1* | 12/2024 | Shen | G06F 1/1652 |
| 2025/0130613 A1* | 4/2025 | Lim | G06F 1/1681 |

FOREIGN PATENT DOCUMENTS

| | | |
|---|---|---|
| EP | 3699728 A1 | 8/2020 |
| KR | 101861602 B1 | 5/2018 |
| KR | 1020190062107 A | 6/2019 |
| KR | 1020190097898 A | 8/2019 |
| TW | M640610 U | 5/2023 |
| WO | 2022035047 A1 | 2/2022 |
| WO | 2022093229 A1 | 5/2022 |
| WO | 2022199450 A1 | 9/2022 |

OTHER PUBLICATIONS

International Search Report and Written Opinion of International Application No. PCT/US2023/023865 dated Dec. 6, 2023, 11 pp.

Office Action from counterpart Application No. 112136197 dated Nov. 25, 2024, 8 pp. Machine Translation.

Response to Office Action dated Nov. 25, 2024, from counterpart Application No. 112136197 filed Jan. 24, 2025, 24 pp. Machine Translation.

Holland et al., "Motorola's Razr folds in half without a crease. The secret is in the hinge design", CNET, retrieved from: https://www.cnet.com/tech/mobile/motorola-razr-folds-in-half-without-crease-secret-hinge-design/, Nov. 21, 2019, 15 pp.

* cited by examiner

FOLDING PORTABLE DISPLAY DEVICE

BACKGROUND

Devices that include displays may be referred to as display devices. In general, it may be desirable to increase a size of a display (e.g., the area on which images are displayed) as much as possible. Increasing the size of a display may make the device that includes the display large and unwieldy. For instance, devices with larger displays may not fit in pockets, bags, and the like. One way to increase the size of a display without negatively affecting the portability of the device is to make the device collapsible such that the display can be folded (e.g., in half).

SUMMARY

In general, aspects of this disclosure are directed to a hinge assembly of a folding device. Folding devices may generally include two assemblies connected via a hinge assembly and a continuous display that spans the two assemblies. Some continuous displays may include a flared section with relatively large bending radius. Such designs may reduce strain on the displays when folded. However, such designs may also result in continuous displays that are longer (e.g., in a direction perpendicular to the binge) than desired when folded.

In accordance with one or more aspects of this disclosure, a folding device may include components configured to cause the assemblies to slide relative to the hinge assembly when the folding device is opened. For instance, the folding device may include a scoop rotatably connected to a first assembly of the folding device and configured to slide within a scoop receiver of a hinge assembly of the folding device. As the folding device is opened, the shape and location of the scoop receiver and the scoop may cause the first assembly to slide relative to the hinge assembly, thereby reducing a total width of the device (e.g., perpendicular to the folding axes) and allowing the continuous display to lie flat without being stretched. The folding device may further include an arm connecting the first assembly to the hinge assembly. The arm may be rotatably connected to the hinge assembly at an axis about which the first assembly actually rotates. Various non-sliding functions (e.g., assembly rotation synchronization, rotation friction resistance, etc.) may be performed by the arm. As such, forces on the scoop may be reduced while still enabling performance of sliding and non-sliding functions. In this way, aspects of this disclosure may improve the feeling (e.g., how opening and closing the folding device feel to a user), cycling life, open-close force advantages, etc., of a binge assembly of a folding device.

In some examples, a folding device includes a first assembly; a second assembly; a hinge assembly comprising: a first gear defining a first gear axis; a first scoop receiver defining a first scoop axis; and a continuous display spanning the hinge assembly from the first assembly to the second assembly; and first assembly linkage components comprising: a first arm having a medial end rotatably connected to the hinge assembly about the first gear axis and a lateral end slidably connected to the first assembly; and a first scoop having a curved medial end that slides within the first scoop receiver about the first scoop axis and a lateral end rotatably connected to the first assembly about a first scoop rotating center.

The details of one or more examples are set forth in the accompanying drawings and the description below. Other features, objects, and advantages of the disclosure will be apparent from the description and drawings, and from the claims.

DETAILED DESCRIPTION

In general, this disclosure is directed to folding devices that include foldable continuous displays with a supported span. A folding device may include at least two assemblies (e.g., panels) and a mechanism configured to allow the assemblies to be moved into a collapsed state in which the device is considered closed and an expanded state in which the device is considered open. When the device is in the expanded state, a display may be visible and may cover at least a portion of an inner surface of all of the assemblies. As such, the device may be considered to be a continuous display (i.e., because it continues across or spans a boundary between the assemblies). By utilizing such a folding device, the device may include a display with a relatively large length and/or width (e.g., display area) without overly increasing a length and/or width of the device when in the collapsed state. In this way, the "pocketability" of large-screen portable devices may be improved.

Figure 1A:
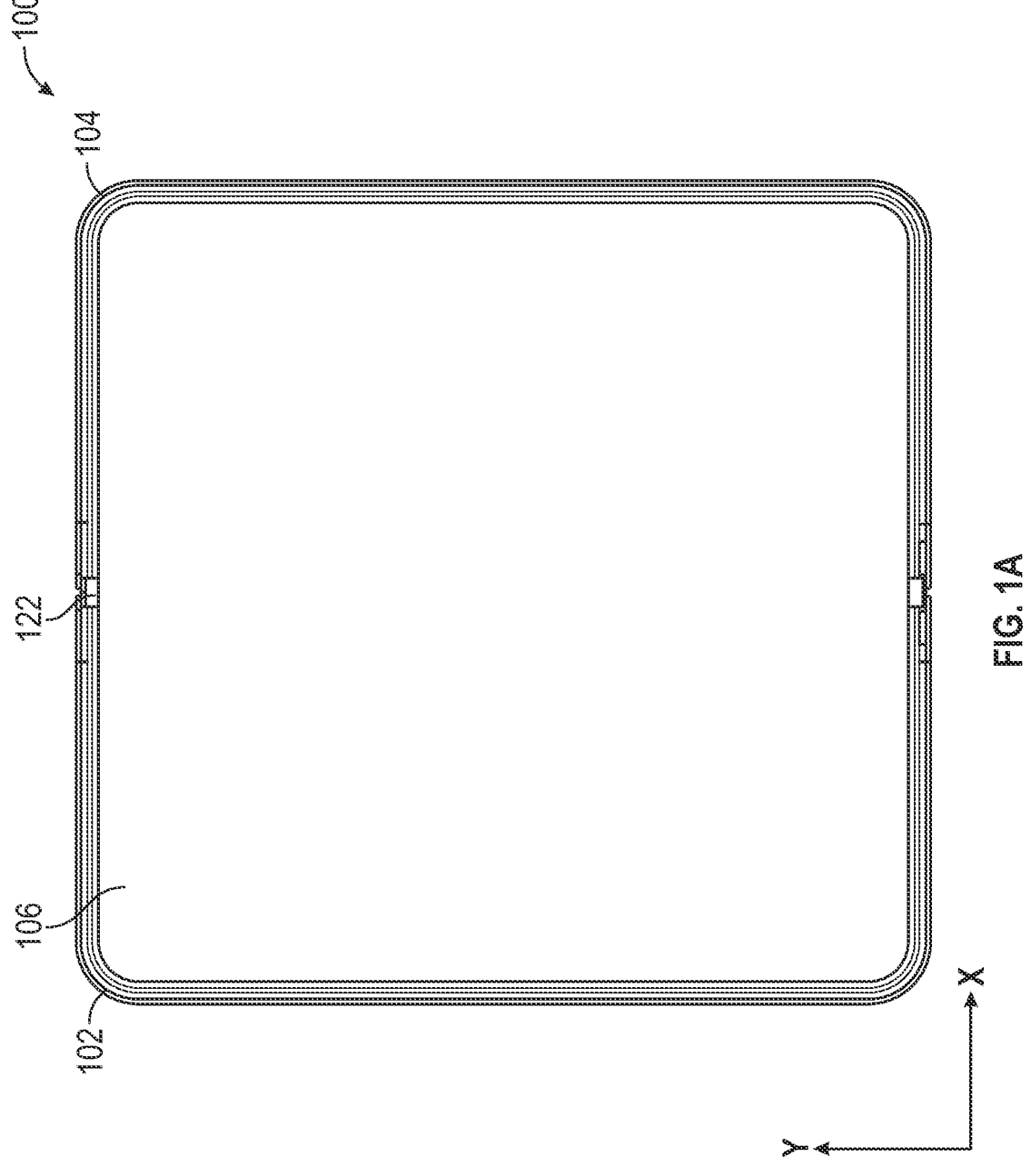
FIGS. 1A and 1B are schematic diagrams illustrating a folding device 100 with a flexible continuous display, in accordance with one or more aspects of this disclosure.
Figure 1B:
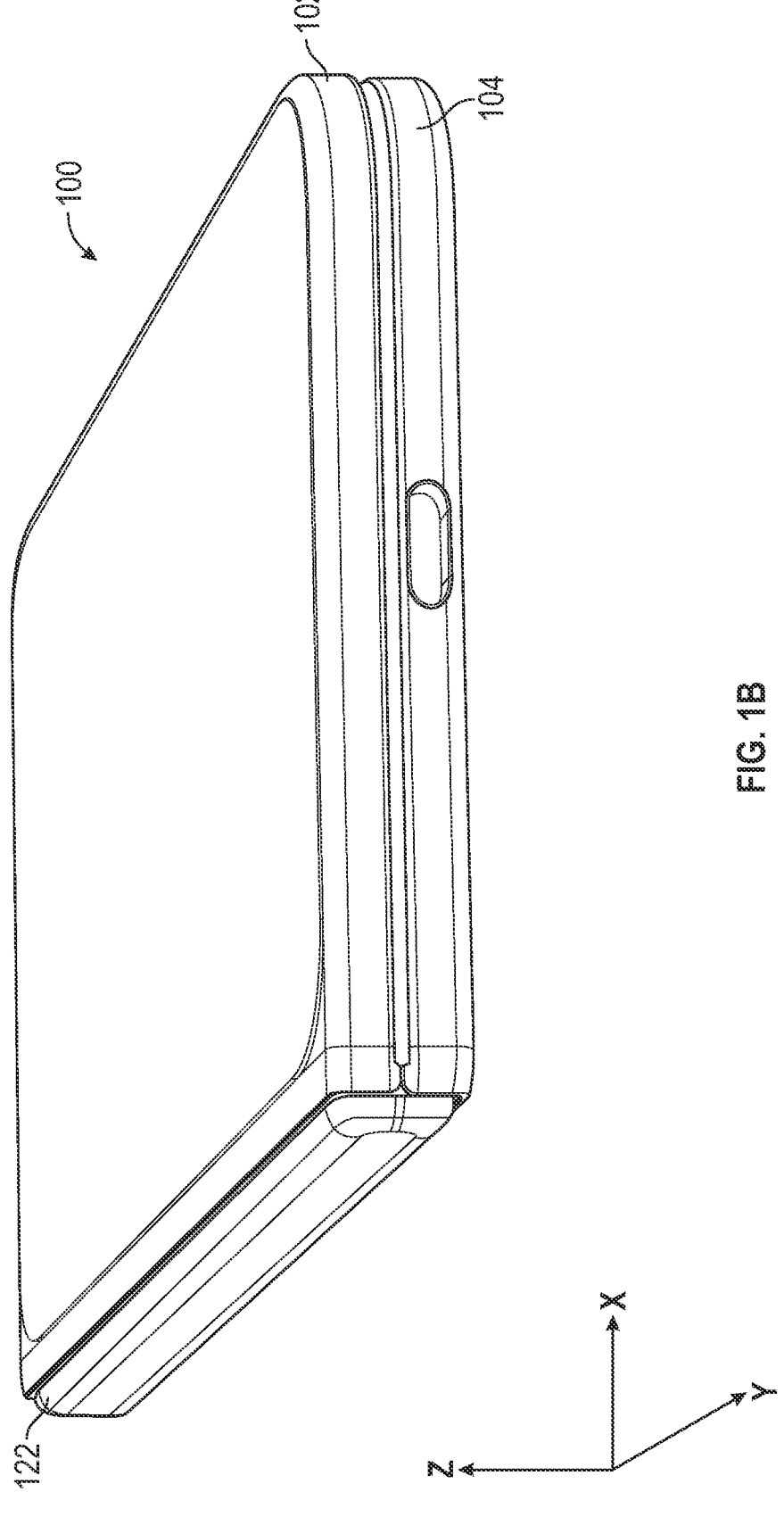

FIGS. 1A and 1B are schematic diagrams illustrating a folding device 100 with a flexible continuous display, in accordance with one or more aspects of this disclosure. Examples of device 100 include foldable mobile computing devices such as foldable smart phones, foldable tablets, foldable e-readers, foldable gaming systems, or any other foldable portable device that includes a display.

As shown in FIGS. 1A and 1B, device 100 includes a first assembly 102, second assembly 104, continuous display 106, and hinge assembly 122. Each of first assembly 102 and second assembly 104 may include an inner surface and an outer surface. The outer surface of first assembly 102 may be visible when looking down at device 100 in the z-axis and the outer surface of second assembly 104 may be visible when looking up at device 100 in the z-axis. The inner surfaces of first assembly 102 and second assembly 104 may not be externally visible when device 100 is closed. As further shown in FIG. 1A, when folding device 100 is fully open, an inner surface of a first assembly 102 is coplanar with an inner surface of a second assembly 104.

Computing and/or electrical components of device 100 may be distributed amongst first assembly 102 and second assembly 104. For example, first assembly 102 may include a main logic board and second assembly 104 may include a battery. This is merely one example arrangement of components amongst first assembly 102 and/or second assembly 104; other arrangements are possible. For instance, both first assembly 102 and second assembly 104 may include respective batteries.

Continuous display 106 may be capable of rendering data into images viewable by a user of device 100. For example, continuous display 106 may include a matrix of pixels that are individually controllable. Examples of continuous display 106 include, but are not limited to, liquid crystal displays (LCD), light emitting diode (LED) displays, organic light-emitting diode (OLED) displays, micro light-emitting diode (microLED) displays, or similar monochrome or color displays capable of outputting visible information to a user of device 100. Continuous display 106 may span hinge assembly 122 from first assembly 102 to second assembly 104.

In some examples, device 100 may include one or more displays in addition to continuous display 106. For instance, device 100 may include a first additional display on the outer surface of first assembly 102. In some examples, device 100 may further include a second additional display on the outer surface of second assembly 104.

One or more of continuous display 106, the first additional display, and/or the second additional display may be presence-sensitive displays. In some examples, a presence sensitive display may detect an object at and/or near a screen. As one example range, a presence-sensitive display may detect an object, such as a finger or stylus that is within 2 inches of the screen. The presence-sensitive display may determine a location (e.g., an (x,y) coordinate) of a screen at which the object was detected. In another example range, a presence-sensitive display may detect an object within six inches of the screen. Other ranges are also possible. The presence-sensitive display may determine the location of the screen selected by a user's finger using capacitive, inductive, and/or optical recognition techniques. In some examples, the presence sensitive display also provides output to a user using tactile, audio, or video stimuli.

In general, hinge assembly 122 may be relatively complex and expensive. For example, hinge assembly 122 may include multiple components, such as gears, springs, and bearings, that need to conform to precise specifications to ensure that hinge assembly 122 functions properly. Additionally, hinge assembly 122 may be susceptible to damage. For example, dirt, dust, and other debris can accumulate in hinge assembly 122, causing it to become stiff or difficult to move. Hinge assembly 122 may also experience wear and tear due to repeated use, causing hinge assembly 122 to become loose, wobbly, or misaligned. Misalignment of hinge assembly 122 may lead to damage to display 106 or other components of device 100.

Continuous display 106 may include a flared section with relatively large bending radius. For instance, a portion of continuous display 106 located proximal to hinge assembly 122 may be flared (e.g., in a "teardrop" or similar shape). This flaring of continuous display 106 may reduce strain on continuous display 106 when folded. However, such designs may also result in a length of continuous display 106 (e.g., in the X-axis) being greater than desired when unfolded.

In accordance with one or more aspects of this disclosure, device 100 may include components configured to cause first assembly 102 and second assembly 104 to slide relative to hinge assembly 122 when device 100 is opened. For instance, device 100 may include a scoop rotatably connected to first assembly 102 and configured to slide within a scoop receiver of hinge assembly 122. As device 100 is opened, the shape and location of the scoop receiver and the scoop may cause first assembly 102 to slide relative to hinge assembly 122, thereby reducing a width of device 102 (e.g., first assembly 102 and second assembly 104 may slide closer to hinge assembly 122 as device 100 is opened and may slide away from hinge assembly 122 as device 100 is closed). Device 100 may further include an arm connecting first assembly 102 to hinge assembly 122. The arm may be rotatably connected to hinge assembly 122 at an axis about which first assembly 102 actually rotates. The combination of the scoop and arm may enable first assembly 102 to rotate and slide relative to hinge assembly 122. Various non-sliding functions (e.g., assembly rotation synchronization, rotation friction resistance, etc.) may be performed by the arm. As such, forces on the scoop may be reduced while still enabling performance of sliding and non-sliding functions. In this way, aspects of this disclosure may improve the feeling (e.g., bow opening and closing the folding device feel to a user), cycling life, open-close force advantages, etc., of a hinge assembly of a folding device.

FIGS. 2A-2L are views of components of a hinge assembly of a folding device, in accordance with one or more aspects of the disclosure. Hinge assembly 222 of FIGS. 2A-2L may be an example of hinge assembly 122 of device 100 of FIGS. 1A and 1B. Similarly, folding device 200 may be an example of device 100.

Figure 2A:
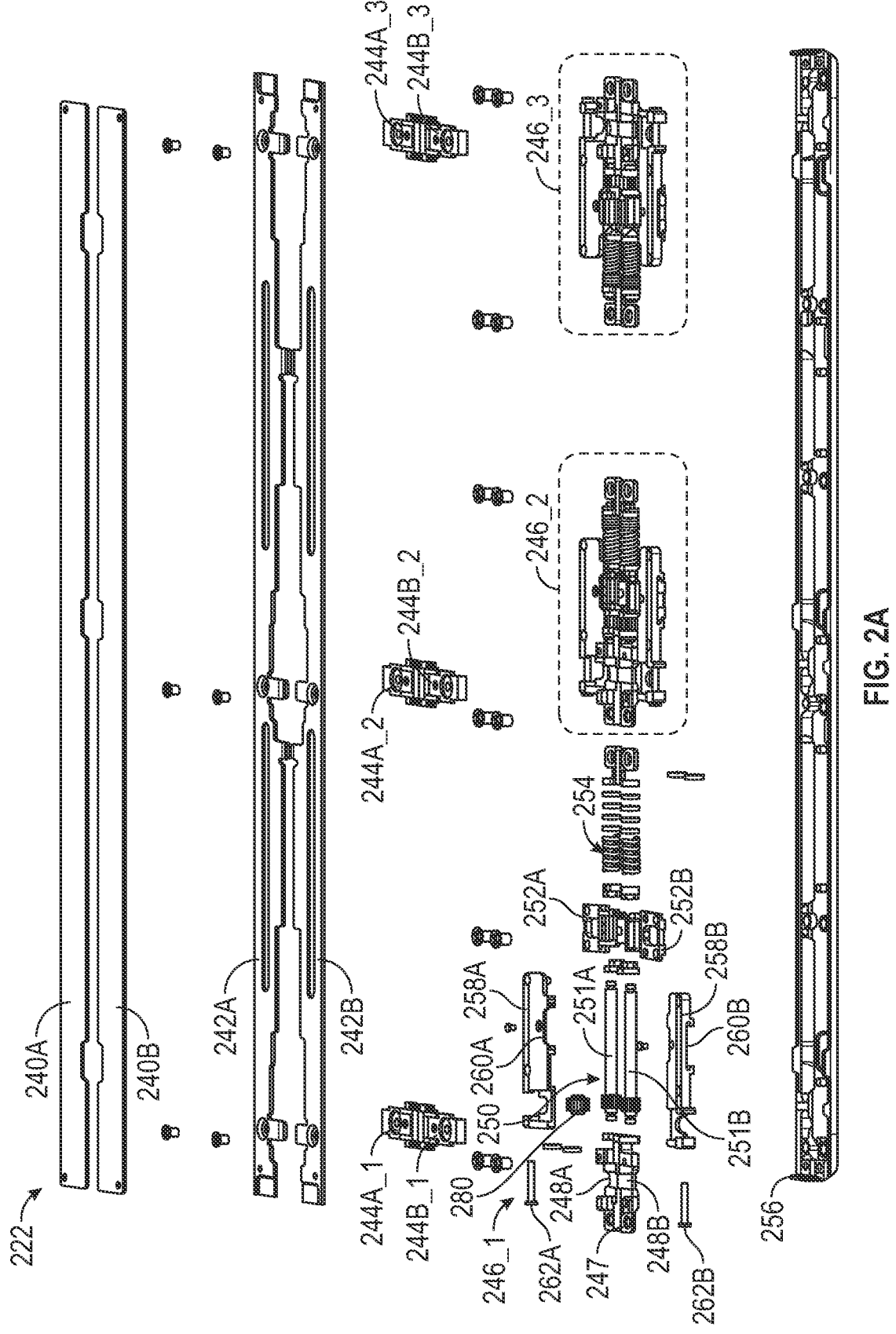
FIGS. 2A-2L are views of components of a hinge assembly of a folding device, in accordance with one or more aspects of the disclosure.
Figure 2B:
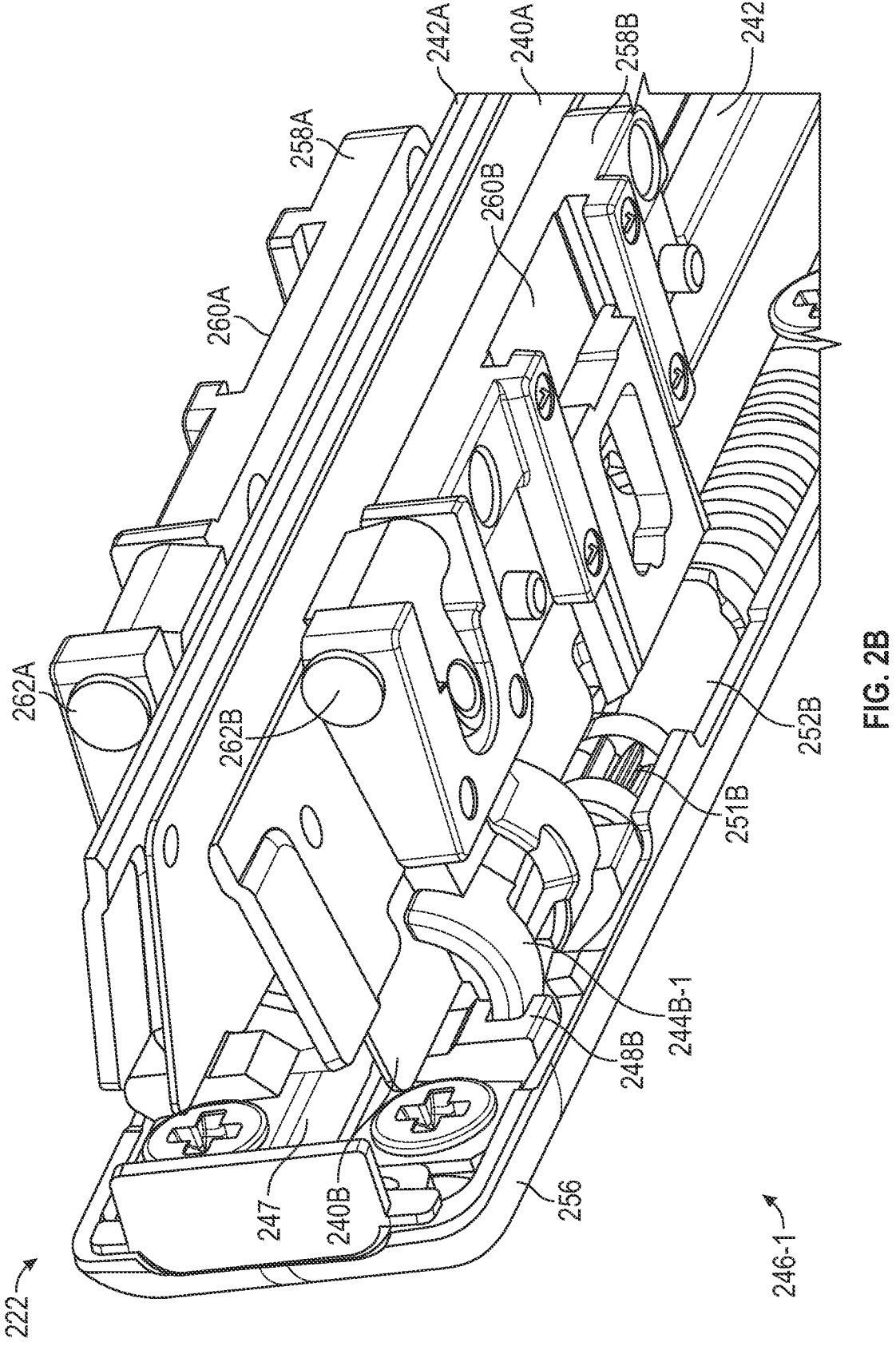
Figures 2C, 2D, 2E:
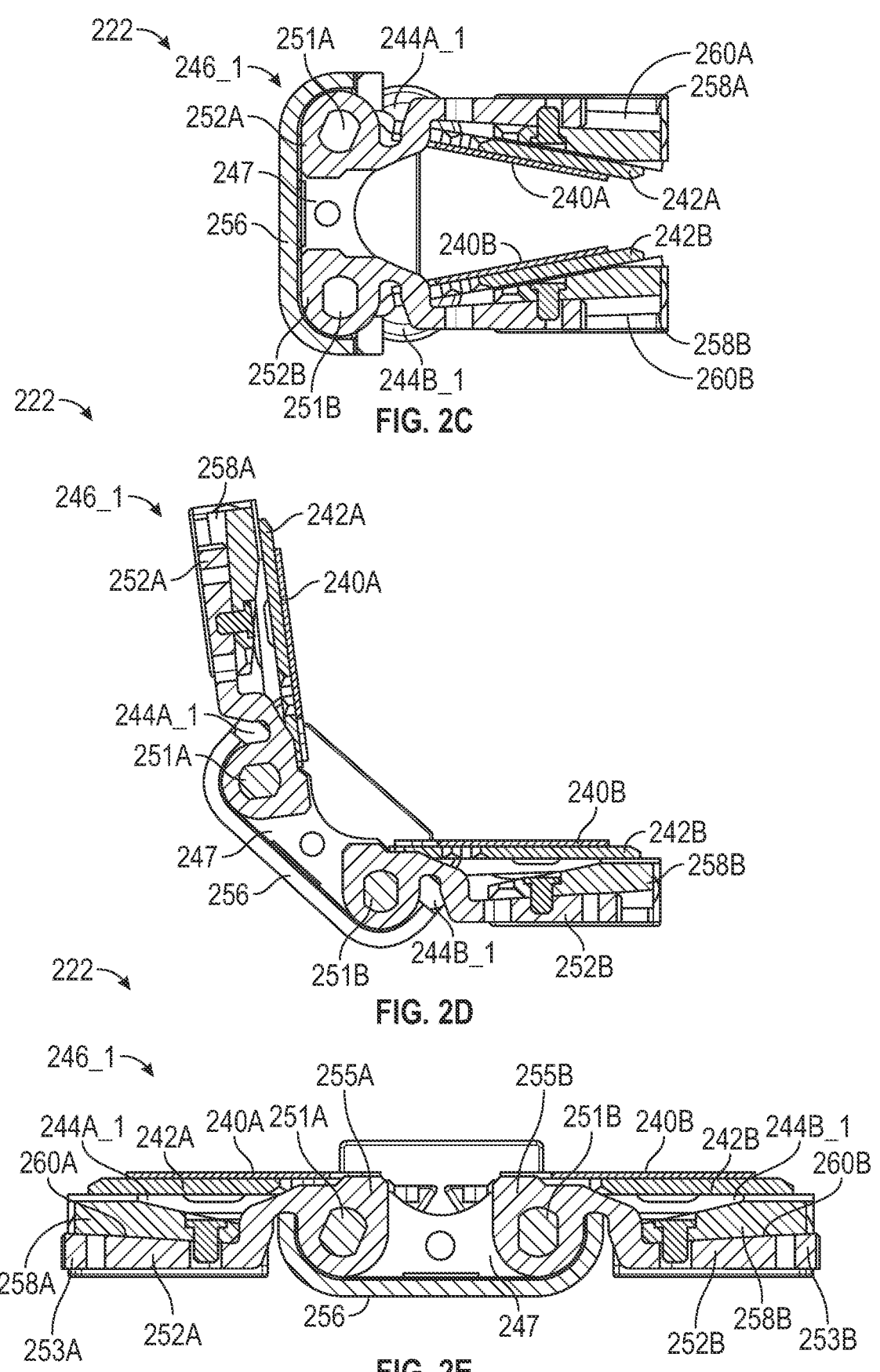
Figure 2F:
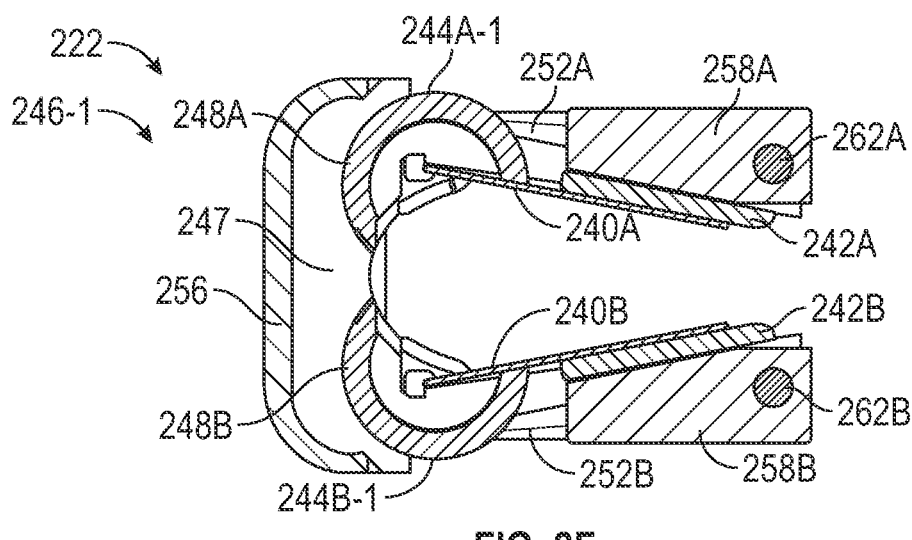
Figure 2G:
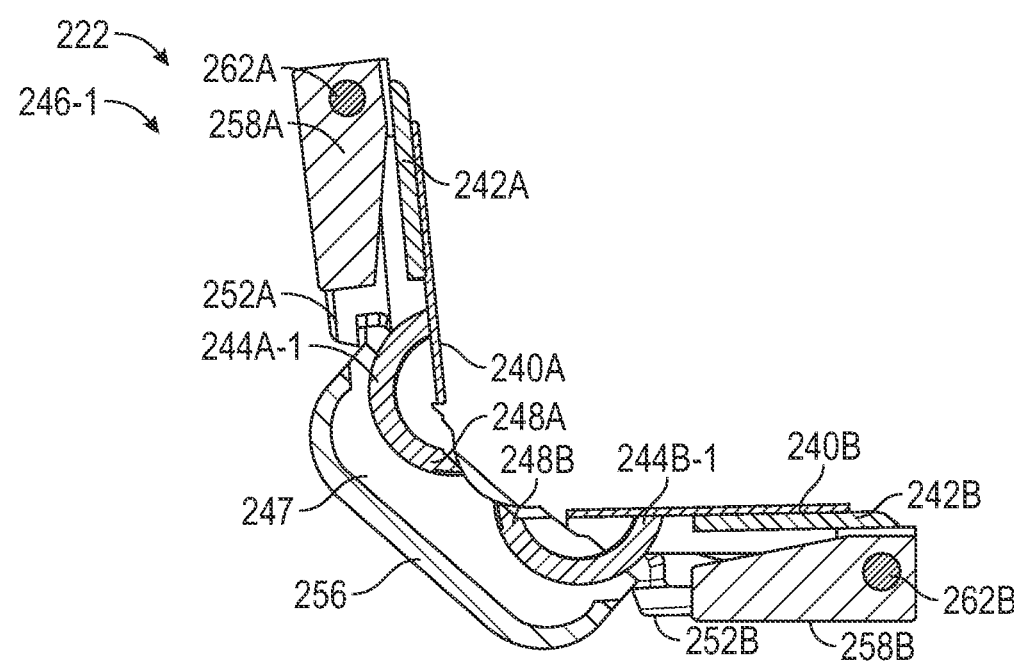
Figure 2H:
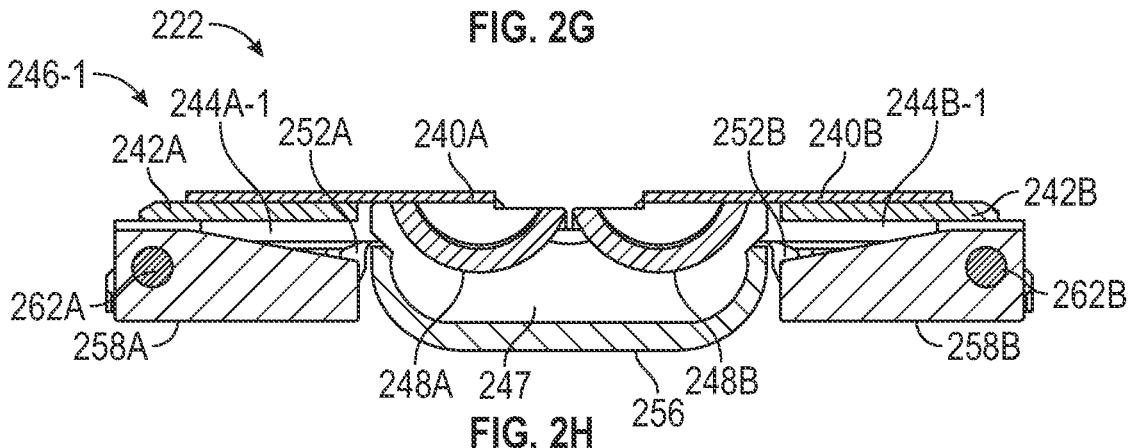
Figure 2I:
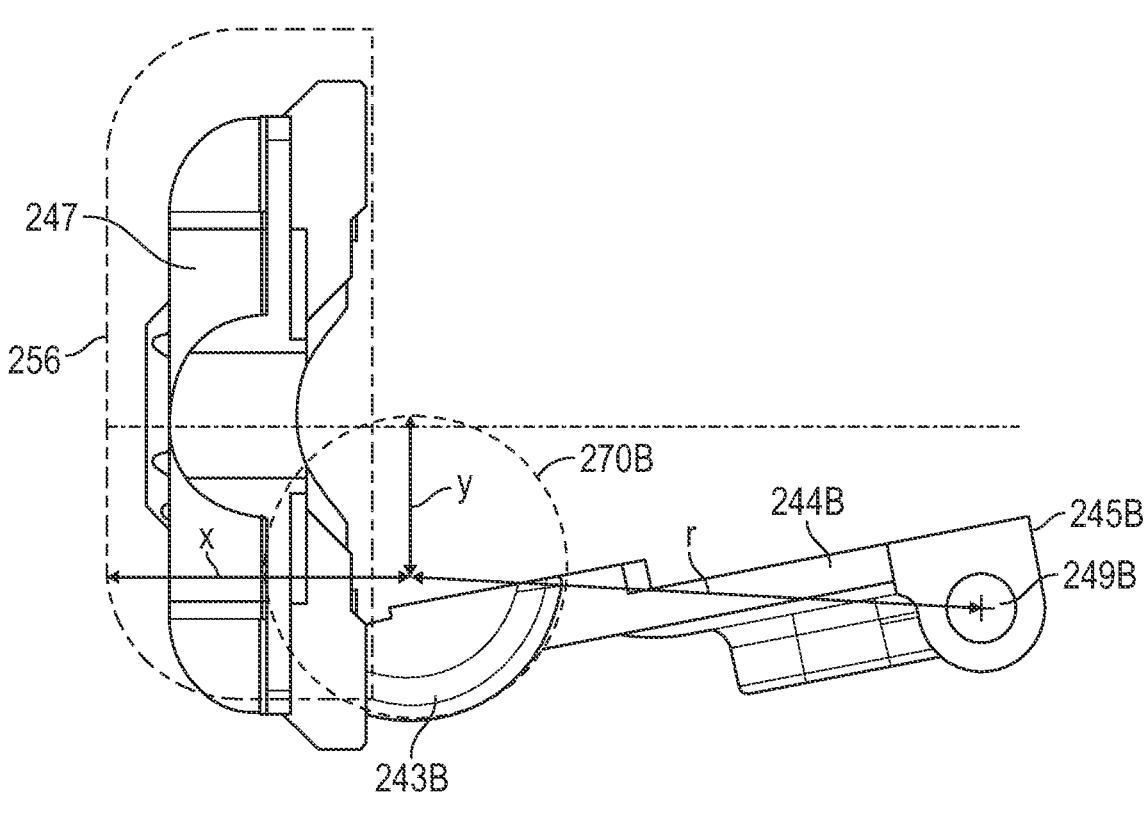
Figure 2J:
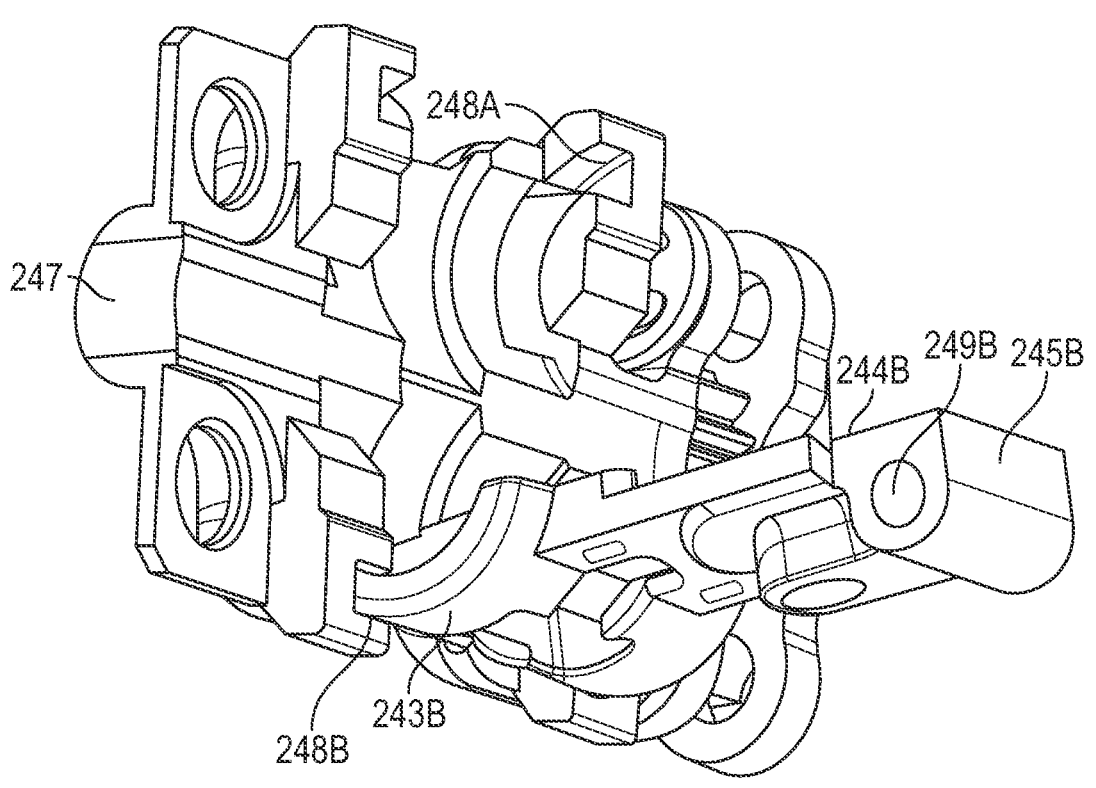
Figure 2K:
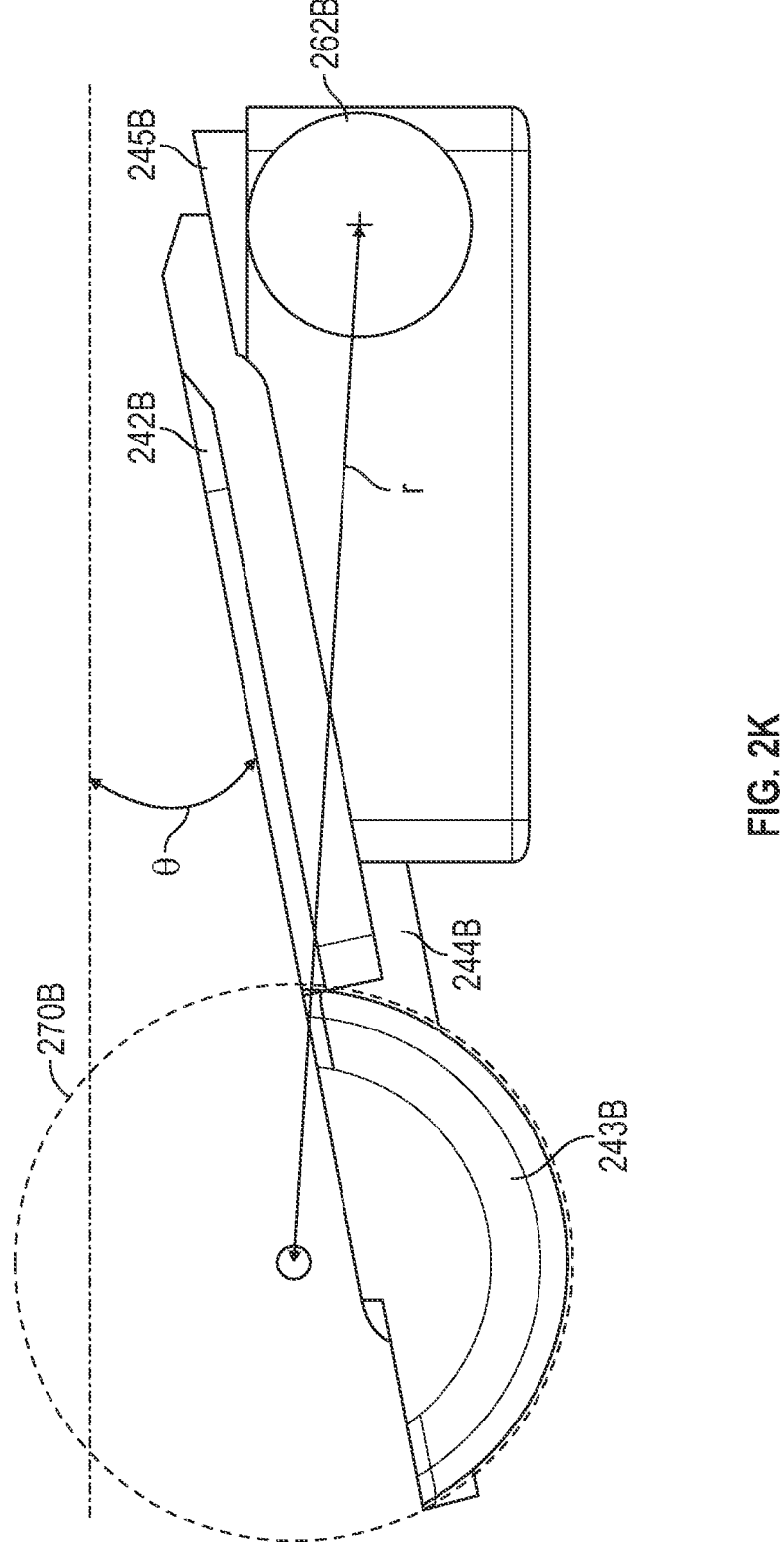
Figure 2L:
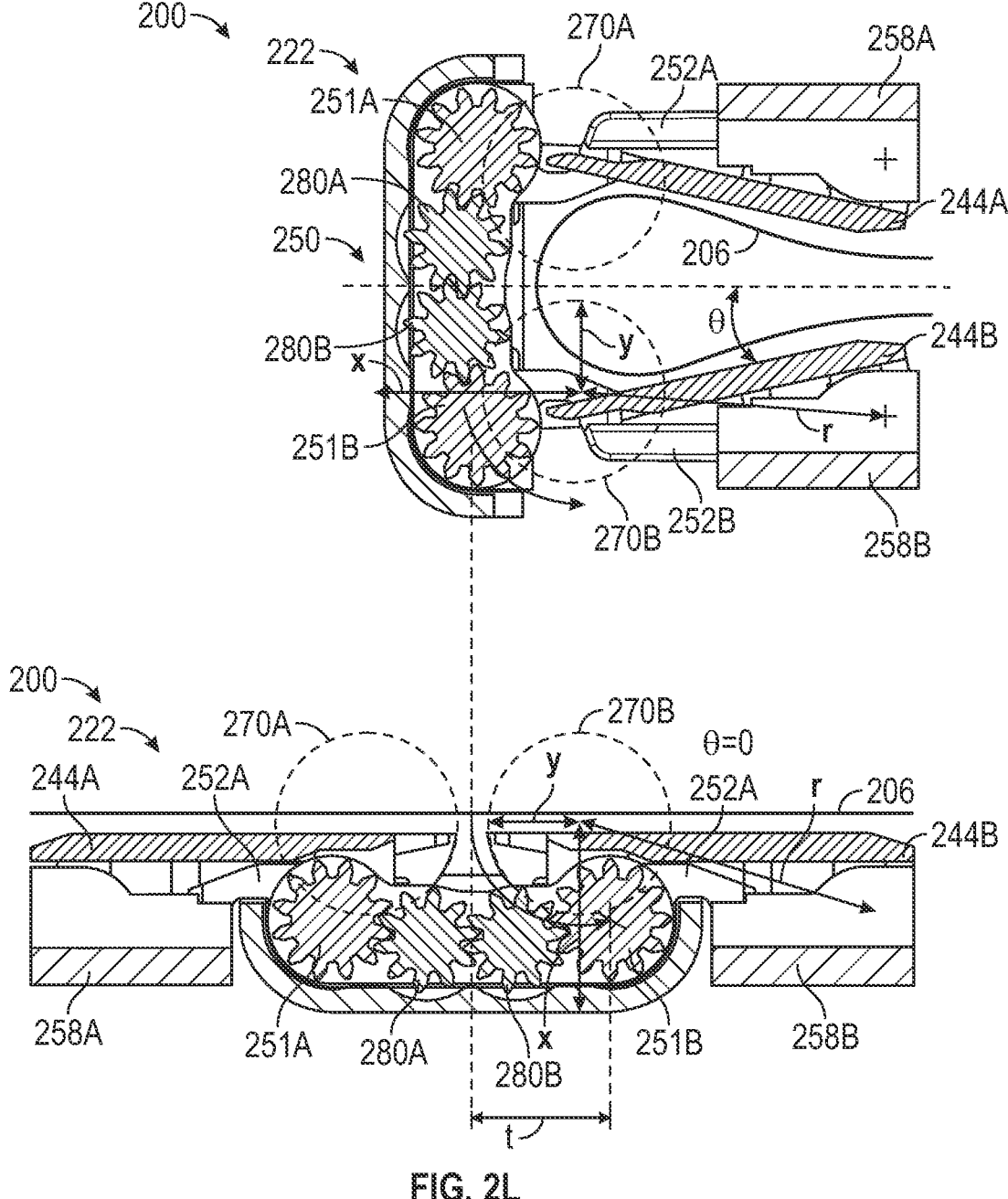

FIG. 2A is an exploded view of a hinge assembly of a folding device, in accordance with one or more aspects of this disclosure. FIG. 2B is a close-up view of a hinge assembly of a folding device in a closed state, in accordance with one or more aspects of this disclosure. FIGS. 2C-2E are cross-sectional views of a hinge assembly of a folding device at arms, in accordance with one or more aspects of this disclosure. FIGS. 2F-2H are cross-sectional views of a hinge assembly of a folding device at scoops, in accordance with one or more aspects of this disclosure. FIGS. 21 and 2J are views of a scoop and a barrel with scoop receivers, in accordance with one or more aspects of this disclosure. FIG. 2K is a cross-sectional view of a scoop and bracket, in accordance with one or more aspects of this disclosure. FIG. 2L shows cross-sectional views of a hinge assembly of a folding device at opened and closed states, in accordance with one or more aspects of this disclosure.

As shown in FIG. 2A, hinge assembly 222 may include supporting plates 240A and 240B (collectively. "supporting plates 240"), supporting plate bases 242A and 242B (collectively, "supporting plate bases 242"), scoops 244A_1-244B_3 (collectively, "scoops 244"), torque modules 246_1-246_3 (collectively, "torque modules 246"), and hinge cover 256. Each of torque modules 246 may include various components to link hinge assembly 222 to a first assembly and/or a second assembly. For example, torque module 264_1 may include barrel 247, arms 252A and 252B (collectively, "arms 252"), brackets 258A and 258B (collectively, "brackets 258"), torque components 254, synchronization components 250, gear shafts 251A and 251B (collectively, "gear shafts 251"), pins 262A and 262B (collectively, "pins 262"). While illustrated in FIG. 2A as including the same components (with torque module 246_3 merely mounted 180 degrees from torque modules 246_1 and 246_2), in some examples, some of torque modules 246 may include varying components.

Hinge cover 256 may operate as a base to which torque modules 246 may be attached. Hinge cover 256 may also provide cosmetic concealment and environmental protection of torque modules 246.

Brackets 258 may be mounted to assemblies. For instance, bracket 258A may be mounted (e.g., fixedly/non-moveably mounted) to a first assembly such as first assembly 102 of FIGS. 1A and 1B. Similarly, bracket 258B may be mounted (e.g., fixedly/non-moveably mounted) to a second assembly such as second assembly 104 of FIGS. 1A and 1B. In some examples, brackets 258 may be formed as features of the first assembly and the second assembly. As such, in some examples, objects described as mounted or connected to brackets 258 may be similarly interpreted as being mounted or connected to the first assembly/second assembly. For instance, an object described as being rotatably mounted to bracket 258A may be considered to be rotatably attached to the first assembly.

Brackets 258 may include features configured to attach to other components of hinge assembly 222, such as arms 252 and scoops 244. As one example, bracket 258A may include features through which pin 262A may be inserted to secure scoop 244A_1 to bracket 258A (e.g., such that lateral end of scoop 244A_1 is rotatably connected to bracket 258A). As another example, bracket 258B may include features through which pin 262B may be inserted to secure scoop 244B_1 to bracket 258B (e.g., such that lateral end of scoop 244B_1 is rotatably connected to bracket 258B). As another example, bracket 258A may include channel 260A through which a lateral end of arm 252A may be slidingly connected to bracket 258A. As another example, bracket 258B may include channel 260B through which a lateral end of arm 252B may be slidingly connected to bracket 258B.

Scoops 244 may be configured to provide force to slide assemblies (e.g., first assembly 102 and second assembly 104) relative to hinge assembly 222 as folding device 200 is opened and closed. Each scoop of scoops 244 may have a medial end and a lateral end. The medial end of a scoop may be the end closer to hinge assembly 222, and the lateral end of a scoop may be the end farther away from hinge assembly 222. For instance, as shown in FIG. 21, scoop 244B may have medial end 243B and lateral end 245B.

Barrel 247 may define features, such as scoop receivers, configured to receive medial ends of scoops 244. For instance, as shown in FIG. 2J, barrel 247 may define scoop receivers 248A and 248B (collectively, "scoop receivers 248") respectively configured to receive medial ends of scoops 244A and 244B.

Medial ends of scoops 244 may have geometry configured to slide within scoop receives 248. As one example, medial ends of scoops 244 may be curved such that the medial ends of scoops 244 may rotatably slide within the scoop receivers. For instance, as shown in FIGS. 2A-2J, medial end 243B of scoop 244B may be curved to slide within scoop receiver 248B of barrel 247.

Lateral ends of scoops 244 may be rotatably attached to brackets 258 (e.g., and may thereby be considered to be rotatably attached to the first and second assemblies). As one example, lateral ends of scoops 244 may define lumens through which a pin may be passed to rotatably connect the lateral ends of scoops 244 to brackets 258. For instance, lateral end 245B of scoop 244B may define lumen 249B through which pin 262B may be passed in order to rotatably connect scoop 244B to bracket 258B.

Gear shafts 251 may each respectively define (e.g., rotate about) a gear axis. For instance, gear shaft 251A may define a first gear axis and gear shaft 251B may define a second gear axis. Rotation of gear shafts 251 may be synchronized by synchronization components 250. For instance, synchronization components 250 may include two auxiliary gears 280A and 280B (collectively, "auxiliary gears 280") connected to gears of gear shafts 251. Auxiliary gears 280 may cause gear shafts 251 to rotate at equal and opposite rate, thereby synchronizing the movements of the first assembly and the second assembly.

Arms 252 may be configured to provide non-sliding forces to the assemblies (e.g., first assembly 102 and second assembly 104) relative to hinge assembly 222 as folding device 200 is opened and closed. Arms 252 may have medial ends rotatably connected to the hinge assembly. For instance, arm 252A may have medial end 255A connected to gear shaft 251A, which is rotatably connected to barrel 247 of hinge assembly 222. As such, arm 252A may be considered to be rotatably connected to barrel 247 about a first hinge axis.

Arms 252 may have lateral ends slidably connected to the assemblies (e.g., first assembly 102 and second assembly 104). As one example, lateral end 253A of arm 252A may slide (e.g., linearly slide) within channel 260A of bracket 258A. As such, arm 252A may be considered to be slidably connected to bracket 258A. As another example, lateral end 253B of arm 252B may slide (e.g., linearly slide) within channel 260B of bracket 258B. As such, arm 252B may be considered to be slidably connected to bracket 258B.

As noted above, scoops 244 may generate forces that cause brackets 258, and thereby the assemblies, to slide relative to hinge assembly 222. Where arms 252 are slidably connected to brackets 258, said forces generated by scoops 244 cause the assemblies to slide relative to hinge assembly 222 along the lateral ends of arms 252. For instance, scoop 244A_1 (along with scoops 244A_2 and 244A_3, if present) may generate force that causes a first assembly (e.g., first assembly 102) to slide relative to hinge assembly (e.g., relative to cover 256) along lateral end 253A of arm 252A. Similarly, scoop 244B_1 (along with scoops 244B_2 and 244B_3, if present) may generate force that causes a second assembly (e.g., second assembly 104) to slide relative to hinge assembly (e.g., relative to cover 256) along lateral end 253B of arm 252B.

Scoops 244 may slide within scoop receivers 248 about a scoop center, that defines a scoop axis. For instance, scoop 244B may rotate within scoop receiver 248B about scoop center 270B (e.g., scoop center 270B may be the center of the circle denoted as 270B, shown as a black dot in FIG. 2K), with a second scoop axis being defined as scoop center 270B. Similarly, scoop 244A may rotate within scoop receiver 248A about scoop center 270A, with a first scoop axis being defined as scoop center 270A. The coordination of scoops 244 with respect to the scoop receivers/barrel 247 may be defined by an x and a y value. The x value may be a distance between the scoop center and a bottom of hinge cover 256. The y value may be a distance between the scoop center and a midline of the folding device. Examples of x and y values are shown in FIG. 21. At the lateral end, the coordination of scoops 244 and brackets 258 may be defined by a θ and a r value. Examples of θ and r values are shown in FIG. 2K. The A value may be the angle between a plane at a top of scoops and a midline of the folding device. The r value may be a distance between a scoop rotating center (e.g., a rotation axis of pin 262B and/or center of lumen 249B. As can be seen, the scoop center can be defined by either the x/y coordinate system or the θ/r coordinate system.

As can bee seen in FIG. 2L, scoop center 270B moves as folding device 200 transitions between the fully closed state (shown at top of FIG. 2L) and the fully open state (shown at bottom of FIG. 2L). This movement of scoop center 270B (e.g., a similar movement of scoop center 270A) may enable improved operation of folding device 200. For instance, as discussed in further detail below, the movement of scoop center 270B may be used to control movement of support plates with precise angular control and reduced part count.

Movement of other components of folding device 200 may be dependent on the scoop centers. For instance, movement of gear shafts 251 may be dependent on scoop centers. As one example, as folding device 200 transitions from fully closed to fully open, a first gear axis (e.g., axis defined by the longitudinal axis of gear shaft 251A) may rotate about the first scoop axis. In some examples, the first gear axis may rotate about the first scoop axis by 90 degrees as folding device 200 transitions from fully closed to fully open.

The collective movement of the components of hinge assembly 222 may cause the assemblies (e.g., first assembly 102 and second assembly 104) to slide relative to hinge assembly 222 as folding device 200 transitions from fully closed to fully open (e.g., such that the assemblies slide towards hinge assembly 222 as the device is being opened). For instance, as shown in FIG. 2L, each of the assemblies may slide a distance t. Where both assemblies slide, the total change in distance may be 2t. As discussed above, this sliding/contraction may enable continuous display 206 to lie flat without being damaged.

Torque components 254 may be configured to generate torque with respect to the assemblies (e.g., first assembly 102 and second assembly 104). For instance, torque components 254 may generate force to resist movement of the assemblies (e.g., resist opening and closing of the foldable device). The force generated by torque components 254 may be imparted on gear shafts 251, which in turn may impart the force on arms 252. In this way, arms 252 may provide non-sliding forces. As noted above, by utilizing scoops 244 to provide sliding forces and other components, such as arms 252, to provide non-sliding forces, the force load on scoops 244 may be reduced, which may improve device longevity.

As noted above, in some examples, folding device 200 may include supporting plates 240. In general, supporting plates 240 may be configured to support a backside of a continuous display, such as continuous display 206. In some examples, supporting plates 240 may be collapsible supporting plates in that supporting plates 240 may fold away or otherwise be stowed when folding device 200 is closed. In some examples, actuation of supporting plates 240 may be performed by one or more components of hinge assembly 222. For instance, actuation of supporting plates 240 may be performed by scoops 244. As one example, supporting plates 240 may be mounted to scoops 244 (e.g., either directly or via supporting plate bases 242). For instance, supporting plate 240A may be attached to at least scoop 244A and supporting plate 240B may be attached to at least scoop 244B. As such, as scoops 244 move (e.g., due to forces generated by the interaction of the medial ends 243 of scoops 244 and scoop receivers 248), scoops 244 may press supporting plates 240 up against a rear of continuous display 206. The resulting forces on continuous display 206 may assist in preventing or limiting deformation in continuous display 206 and/or provide a consistent support of continuous display 206 as a user drags their finger across the span of continuous display 206 between the first and second assembly.

Figures 3A, 3B:
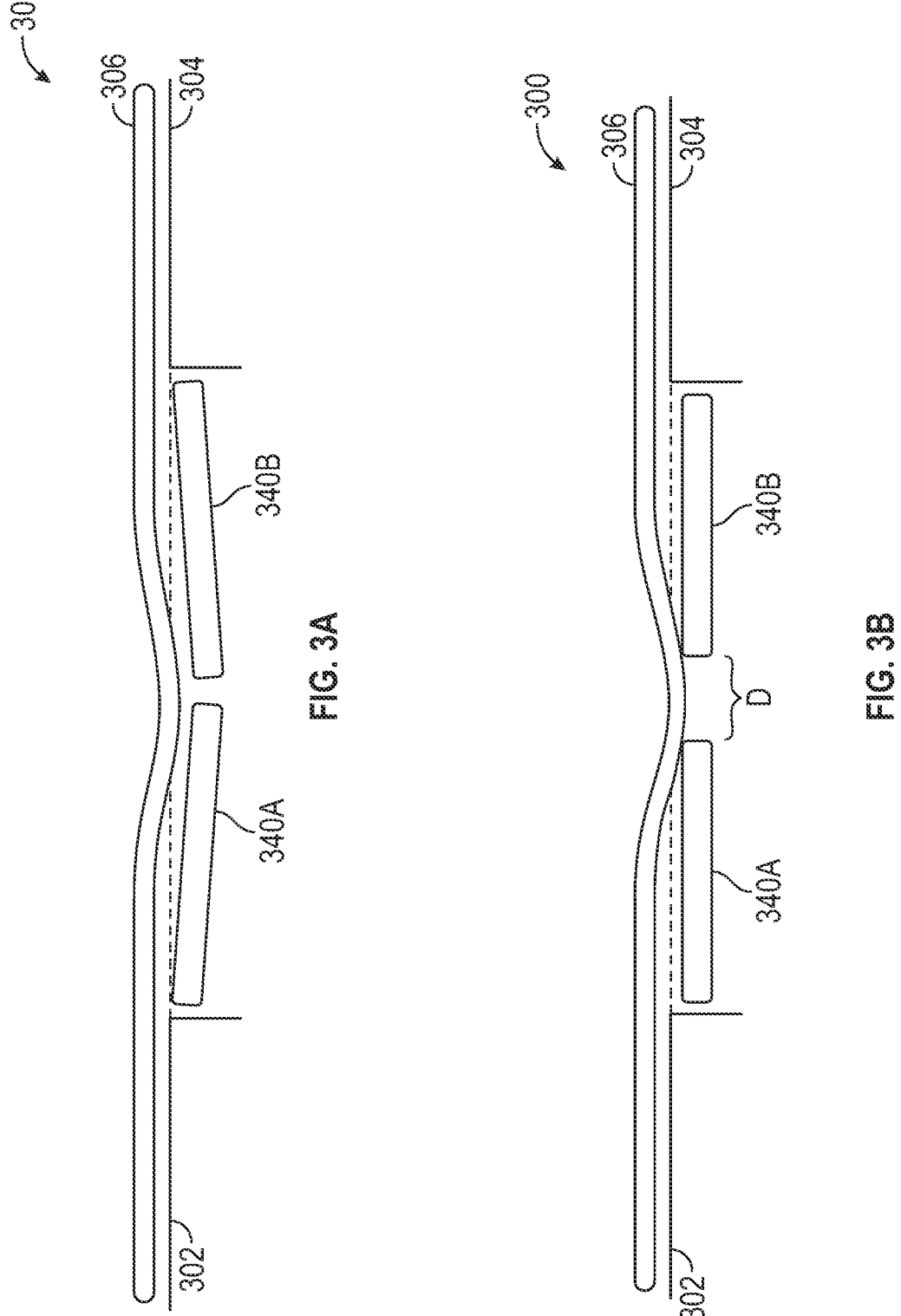
FIGS. 3A and 3B are conceptual diagrams illustrating example supporting plates, in accordance with one or more aspects of this disclosure.

FIGS. 3A and 3B are conceptual diagrams illustrating example supporting plates, in accordance with one or more aspects of this disclosure. Folding device 300, first assembly 302, second assembly 304, and continuous display 306 may be examples of folding device 100, first assembly 102, second assembly 104, and continuous display 106 of FIGS. 1A and 1B. Similarly, supporting plates 340A and 340B (collectively, "supporting plates 340") may be examples of supporting plates 240A and 240B of FIGS. 2A-2L.

In some examples, it may be desirable for an upper surface of supporting plates 340 to not be parallel with a plane of continuous display 306 when folding device 300 is fully open. For instance, as shown in the example of FIG. 3A, the upper surfaces of supporting plates 340 are not parallel with a plane of continuous display 306 (illustrated as a dashed horizontal line). In some examples, having supporting plates 340 be angled as such may provide advantages. As one example, angled supporting plates 340 may accommodate a deformation in continuous display 306 (the indent at the center) without creating additional humps in continuous display 306.

In some examples, it may be desirable to have a gap between supporting plates 340 when folding device 300 is fully open. For instance, as shown in the example of FIG. 3B, a medial edge of supporting plate 340A may be positioned at a distance (illustrated as distance D) from a medial edge of supporting plate 340B. Examples of the distance value that provide advantages include, but are not limited to, greater than 1.5 mm, 1.8 mm, 2 mm, and 2.2 mm. However, it is understood that the gap should not be too large, or too big a portion of continuous display 306 may be unsupported. Examples of maximum values for D are lesser than 5 mm, 8 mm, and 10 mm. In some examples, having a gap between supporting plates 340 may provide advantages. As one example, having a gap between supporting plates 340 may accommodate a deformation in continuous display 306 (the indent at the center) without creating additional humps in continuous display 306.

In some examples, supporting plates 340 may be both angled and positioned a distance away from each other. For instance, supporting plates 340 may be a combination of the examples of FIGS. 3A and 3B.

The following numbered example may illustrate one or more aspects of this disclosure:

Example 1. A folding device comprising: a first assembly; a second assembly; a hinge assembly comprising: a first gear defining a first gear axis; a first scoop receiver defining a first scoop axis; and a continuous display spanning the hinge assembly from the first assembly to the second assembly; and first assembly linkage components comprising: a first arm having a medial end rotatably connected to the binge assembly about the first gear axis and a lateral end slidably connected to the first assembly; and a first scoop having a curved medial end that slides within the first scoop receiver about the first scoop axis and a lateral end rotatably connected to the first assembly about a first scoop rotating center.

Example 2. The folding device of example 1, wherein the hinge assembly further comprises: a second gear defining a second gear axis; and a second scoop receiver defining a second scoop axis; and the folding device further comprises: second assembly linkage components comprising: a second arm having a medial end rotatably connected to the hinge assembly about the second gear axis and a lateral end slidably connected to the second assembly; and a second scoop having a curved medial end that slides within the second scoop receiver about the second scoop axis and a lateral end rotatably connected to the second assembly about a second scoop rotating center.

Example 3. The folding device of example 1, wherein the first gear axis rotates about the first scoop axis as the folding device transitions from fully closed to fully open.

Example 4. The folding device of example 2, wherein the first gear axis rotates 90 degrees about the first scoop axis as the folding device transitions from fully closed to fully open.

Example 5. The folding device of example 1, wherein, as the folding device transitions from fully closed to fully open, the first scoop causes the first assembly to slide relative to the hinge assembly.

Example 6. The folding device of example 2, wherein, as the folding device transitions from fully closed to fully open: the first scoop causes the first assembly to slide relative to the hinge assembly along the lateral end of the first arm; and the second scoop causes the second assembly to slide relative to the hinge assembly along the lateral end of the second arm.

Example 7. The folding device of example 1, further comprising: torque components configured to generate force to resist rotation of the first assembly relative to the hinge assembly, wherein the force generated by the torque components is transmitted to the first assembly via the first arm.

Example 8. The folding device of example 1, further comprising: a first supporting plate configured to support the continuous display when the folding device is fully open.

Example 9. The folding device of example 8, wherein, when the folding device is fully open, a plane of an upper surface of the first supporting plate is not parallel with a plane of the continuous display on the first assembly.

Example 10. The folding device of example 8, further comprising: a second supporting plate configured to support the continuous display when the folding device is fully open.

Example 11. The folding device of example 10, wherein, when the folding device is fully open, a plane of an upper surface of the second supporting plate is not parallel with a plane of the continuous display on the second assembly.

Example 12. The folding device of example 10, wherein, when the folding device is fully open, a medial edge of the first supporting plate is positioned at a distance from a medial edge of the second supporting plate.

Example 13. The folding device of claim 12, wherein the distance is greater than or equal to 1.5 mm.

Example 14. The folding device of example 8, wherein the first supporting plate is attached to the first scoop such that movement of the first scoop directly results in movement of the first supporting plate.

Example 15. The folding device of example 10, wherein the second supporting plate is attached to the second scoop such that movement of the second scoop directly results in movement of the second supporting plate.

Example 16. The folding device of example 1, wherein the first scoop center is defined by both an x/y coordinate system and an θ/r coordinate system.

Various aspects have been described in this disclosure. These and other aspects are within the scope of the following claims.

The invention claimed is:
1. A folding device comprising:
a first assembly;
a second assembly;
a hinge assembly comprising:
    a first shaft defining a first shaft axis;
    a first scoop receiver defining a first scoop axis;
    a second shaft defining a second shaft axis; and
    a second scoop receiver defining a second scoop axis;
a continuous display spanning the hinge assembly from the first assembly to the second assembly; and
first assembly linkage components comprising:
    a first arm having a medial end rotatably connected to the hinge assembly about the first shaft axis and a lateral end slidably connected to the first assembly; and
    a first scoop having a curved medial end that slides within the first scoop receiver about the first scoop axis and a lateral end rotatably connected to the first assembly about a first scoop rotating center, wherein the first axis rotates about the first scoop axis as the folding device transitions from fully closed to fully open, and wherein the first axis rotates 90 degrees about the first scoop axis as the folding device transitions from fully closed to fully open
second assembly linkage components comprising:
    a second arm having a medial end rotatably connected to the hinge assembly about the second shaft axis and a lateral end slidably connected to the second assembly; and
    a second scoop having a curved medial end that slides within the second scoop receiver about the second scoop axis and a lateral end rotatably connected to the second assembly about a second scoop rotating center.

2. The folding device of claim 1, wherein, as the folding device transitions from fully closed to fully open, the first scoop causes the first assembly to slide relative to the hinge assembly.

3. The folding device of claim 1, wherein, as the folding device transitions from fully closed to fully open:
the first scoop causes the first assembly to slide relative to the hinge assembly along the lateral end of the first arm; and
the second scoop causes the second assembly to slide relative to the hinge assembly along the lateral end of the second arm.

4. The folding device of claim 1, further comprising:
torque components configured to generate force to resist rotation of the first assembly relative to the hinge assembly, wherein the force generated by the torque components is transmitted to the first assembly via the first arm.

5. The folding device of claim 1, further comprising:
a first supporting plate configured to support the continuous display when the folding device is fully open.

6. The folding device of claim 5, wherein, when the folding device is fully open, a plane of an upper surface of the first supporting plate is not parallel with a plane of the continuous display on the first assembly.

7. The folding device of claim 5, further comprising:
a second supporting plate configured to support the continuous display when the folding device is fully open.

8. The folding device of claim 7, wherein, when the folding device is fully open, a plane of an upper surface of the second supporting plate is not parallel with a plane of the continuous display on the second assembly.

9. The folding device of claim 7, wherein, when the folding device is fully open, a medial edge of the first supporting plate is positioned at a distance from a medial edge of the second supporting plate.

10. The folding device of claim 9, wherein the distance is greater than or equal to 1.5 mm.

11. The folding device of claim 5, wherein the first supporting plate is attached to the first scoop such that movement of the first scoop directly results in movement of the first supporting plate.

12. The folding device of claim 7, wherein the second supporting plate is attached to the second scoop such that movement of the second scoop directly results in movement of the second supporting plate.

13. The folding device of claim 1, wherein the first scoop center is defined by both an x/y coordinate system and an θ/r coordinate system.

14. A folding device comprising:
a first assembly;
a second assembly;
a hinge assembly comprising:
    a first shaft defining a first shaft axis;

a first scoop receiver defining a first scoop axis;

a second shaft defining a second shaft axis; and a second scoop receiver defining a second scoop axis; and a continuous display spanning the hinge assembly from the first assembly to the second assembly;

first assembly linkage components comprising:

a first arm having a medial end rotatably connected to the hinge assembly about the first shaft axis and a lateral end slidably connected to the first assembly; and a first scoop having a curved medial end that slides within the first scoop receiver about the first scoop axis and a lateral end rotatably connected to the first assembly about a first scoop rotating center;

a first supporting plate configured to support the continuous display when the folding device is fully open, wherein, when the folding device is fully open, a plane of an upper surface of the first supporting plate is not parallel with a plane of the continuous display on the first assembly, and wherein the first supporting plate is attached to the first scoop such that movement of the first scoop directly results in movement of the first supporting plate;

second assembly linkage components comprising:

a second arm having a medial end rotatably connected to the hinge assembly about the second shaft axis and a lateral end slidably connected to the second assembly; and a second scoop having a curved medial end that slides within the second scoop receiver about the second scoop axis and a lateral end rotatably connected to the second assembly about a second scoop rotating center; and a second supporting plate configured to support the continuous display when the folding device is fully open, wherein, when the folding device is fully open, a plane of an upper surface of the second supporting plate is not parallel with a plane of the continuous display on the second assembly, and wherein the second supporting plate is attached to the second scoop such that movement of the second scoop directly results in movement of the second supporting plate.

15. The folding device of claim 14, wherein, as the folding device transitions from fully closed to fully open, the first shaft axis rotates about the first scoop axis and the second shaft axis rotates about the second scoop axis.

16. The folding device of claim 15, wherein, as the folding device transitions from fully closed to fully open:

the first scoop causes the first assembly to slide relative to the hinge assembly along the lateral end of the first arm; and the second scoop causes the second assembly to slide relative to the hinge assembly along the lateral end of the second arm.

17. The folding device of claim 16, further comprising:

first torque components configured to generate force to resist rotation of the first assembly relative to the hinge assembly, wherein the force generated by the first torque components is transmitted to the first assembly via the first arm; and second torque components configured to generate force to resist rotation of the second assembly relative to the hinge assembly, wherein the force generated by the second torque components is transmitted to the second assembly via the second arm.

18. A folding device comprising:

a first assembly;

a second assembly;

a hinge assembly comprising:

a first shaft defining a first axis;

a first scoop receiver defining a first scoop axis;

a continuous display spanning the hinge assembly from the first assembly to the second assembly;

a first supporting plate configured to support the continuous display when the folding device is fully open, wherein, when the folding device is fully open, a plane of an upper surface of the first supporting plate is not parallel with a plane of the continuous display on the first assembly; and first assembly linkage components comprising:

a first arm having a medial end rotatably connected to the hinge assembly about the first axis and a lateral end slidably connected to the first assembly; and a first scoop having a curved medial end that slides within the first scoop receiver about the first scoop axis and a lateral end rotatably connected to the first assembly about a first scoop rotating center.

* * * * *